United States Patent
Pulido et al.

(10) Patent No.: US 10,043,065 B2
(45) Date of Patent: Aug. 7, 2018

(54) SYSTEMS AND METHODS FOR DETERMINING MEANING OF CULTURAL GESTURES BASED ON VOICE DETECTION

(71) Applicant: Rovi Guides, Inc., Santa Clara, CA (US)

(72) Inventors: Alejandro S. Pulido, Chatsworth, CA (US); Michael R. Nichols, La Canada Flintridge, CA (US)

(73) Assignee: Rovi Guides, Inc., San Jose, CA (US)

( * ) Notice: Subject to any disclaimer, the term of this patent is extended or adjusted under 35 U.S.C. 154(b) by 161 days.

(21) Appl. No.: 14/813,500

(22) Filed: Jul. 30, 2015

(65) Prior Publication Data

US 2017/0032792 A1 Feb. 2, 2017

(51) Int. Cl.
| | |
|---|---|
| G10L 15/20 | (2006.01) |
| G10L 15/00 | (2013.01) |
| G10L 15/06 | (2013.01) |
| G10L 15/04 | (2013.01) |
| G06K 9/00 | (2006.01) |
| G10L 15/02 | (2006.01) |

(52) U.S. Cl.
CPC ........ *G06K 9/00355* (2013.01); *G10L 15/005* (2013.01); *G10L 2015/027* (2013.01)

(58) Field of Classification Search
None
See application file for complete search history.

(56) References Cited

U.S. PATENT DOCUMENTS

| | | | |
|---|---|---|---|
| 6,388,714 B1 | 5/2002 | Schein et al. | |
| 6,756,997 B1 | 6/2004 | Ward, III et al. | |
| 7,165,098 B1 | 1/2007 | Boyer et al. | |
| 7,321,854 B2 * | 1/2008 | Sharma | G10L 15/24 704/243 |
| 8,269,834 B2 * | 9/2012 | Albertson | G08B 13/19613 340/506 |
| 8,791,914 B2 * | 7/2014 | Zhao | G06F 3/011 345/173 |
| 8,902,154 B1 * | 12/2014 | Kahn | G06F 3/017 345/156 |
| 9,134,798 B2 * | 9/2015 | Morris | G06F 3/017 |
| 9,208,678 B2 * | 12/2015 | Albertson | G08B 13/19613 |
| 9,412,011 B2 * | 8/2016 | Albertson | G08B 13/19613 |
| 9,412,369 B2 * | 8/2016 | Wang | G10L 15/26 |
| 9,493,130 B2 * | 11/2016 | Penilla | H04L 67/12 |
| 9,672,823 B2 * | 6/2017 | Penilla | G10L 15/22 |
| 2002/0174430 A1 | 11/2002 | Ellis et al. | |

(Continued)

*Primary Examiner* — Satwant Singh
(74) *Attorney, Agent, or Firm* — Haley Guiliano LLP

(57) ABSTRACT

In some embodiments, control circuitry may detect a voice communication from a human using voice detection circuitry during playback of a media asset being consumed by the user. Control circuitry may then identify an accent characteristic of the voice communication. Control circuitry may cross-reference the accent characteristic against listings of an accent database and then determine, based on the cross-referencing of the accent characteristic a country of origin of the human. Control circuitry may detect, using imaging circuitry, a gesture made by the human. Control circuitry may then cross-reference the gesture against listings of a gesture database associated with the country of origin and then determine based on the cross-referencing of the gesture, a meaning of the gesture in relation to the media asset.

18 Claims, 4 Drawing Sheets

(56) References Cited

U.S. PATENT DOCUMENTS

| | | |
|---|---|---|
| 2003/0110499 A1 | 6/2003 | Knudson et al. |
| 2005/0251827 A1 | 11/2005 | Ellis et al. |
| 2010/0153885 A1 | 6/2010 | Yates |
| 2015/0346837 A1* | 12/2015 | Morris .................... H04L 67/42 715/863 |
| 2016/0111019 A1* | 4/2016 | Chang .................... G09B 19/06 434/185 |
| 2016/0314275 A1* | 10/2016 | Wang ....................... G10L 15/26 |
| 2017/0032783 A1* | 2/2017 | Lord ........................ G10L 15/22 |
| 2017/0090582 A1* | 3/2017 | Ganesan ................. G06F 3/017 |
| 2017/0140757 A1* | 5/2017 | Penilla ................... G10L 15/22 |
| 2017/0200449 A1* | 7/2017 | Penilla ................... G10L 15/22 |

\* cited by examiner

SYSTEMS AND METHODS FOR DETERMINING MEANING OF CULTURAL GESTURES BASED ON VOICE DETECTION

BACKGROUND OF THE INVENTION

Media assets are now globally distributed, and have become increasingly interactive. For example, users are able to interact with media assets to make selections, play games, order products, and the like. As interactivity of media assets increases, the ways in which users are able to interact with media assets also increases. There is a problem where, from a cultural standpoint, a manner in which a user interacts with a media asset may have any of several intended meanings, depending on what culture a person hails from.

SUMMARY

In some aspects, systems and methods are provided for determining what culture a person hails from, and using that determination to determine the meaning of a gesture made by that person. For example, it is known that in the Western culture, a "thumbs up" sign may indicate a positive feeling about a media asset, whereas in Australia, a "thumbs up" sign may indicate a severely negative feeling about a media asset. In order to determine whether a user is offering a "thumbs up" gesture, control circuitry may analyze voice characteristics and/or body characteristics of a user to determine a user's culture.

To achieve these ends and others, in some aspects, systems and methods for determining meaning of cultural gestures based on voice detection are provided. In some embodiments, control circuitry may detect a voice communication from a human using voice detection circuitry during playback of a media asset being consumed by the user. For example, control circuitry may receive voice data by way of a microphone during playback of a media asset to determine vocal characteristics of a particular user viewing the media asset.

In some embodiments, control circuitry may identify an accent characteristic of the voice communication. For example, control circuitry may analyze a manner in which a particular word, syllable, or phrase is annunciated to determine an accent characteristic, such as an inflection in sound or tone, a nasal tone, a cadence, and the like. Control circuitry may then cross-reference the accent characteristic against listings of an accent database and then determine, based on the cross-referencing of the accent characteristic a country of origin of the human. As an example, if a person spoke with a distinctive accent that relates to a country of origin, control circuitry would find a match based on the cross-referencing.

In some embodiments, control circuitry may detect, using imaging circuitry, a gesture made by the human. For example, control circuitry may detect a "thumbs up" gesture using a camera. Control circuitry may then cross-reference the gesture against listings of a gesture database associated with the country of origin and then determine based on the cross-referencing of the gesture, a meaning of the gesture in relation to the media asset. For example, if the country of origin is Australia, control circuitry may determine that the "thumbs up" gesture shows negative distaste based on the cross-referencing, whereas if the country of origin is a Western country, control circuitry may determine that the "thumbs up" gesture shows positive feedback.

In some embodiments, control circuitry may provide a recommendation to the human based on the meaning of the gesture. For example, following from the "thumbs up" example above, if control circuitry determines that a user is from a country of origin where "thumbs up" shows positive feedback, control circuitry may provide a recommendation of a media asset similar to the media asset for which the user gave a "thumbs up."

In some embodiments, control circuitry may tailor the recommendation to the country of origin. For example, control circuitry may, based on the determined country of origin, identify an additional media asset or product that is prevalent or unique to the country of origin and recommend that additional media asset or product.

In some embodiments, the meaning may comprise at least one of: an indication of enjoyment of the media asset by the human; an indication of distaste for the media asset by the human; an indication that the human wishes to suspend viewing the media asset; and an indication that the human wishes to alert information about the media asset to another human. Following the "thumbs up" example above, control circuitry may determine the meaning to be an indication of enjoyment (for a Westerner) or an indication of distaste (for an Australian). As other examples, in some cultures, a detection by control circuitry of a gesture of a hand up with a palm facing toward a display device may indicate that the human wishes to suspend viewing a media asset. Other meanings are possible, such as a human wishing to alert information about the media asset to another human (e.g., by a "typing gesture," which, in some cultures, may mean the human wishes to post his viewing of the media asset to an on-line social media service).

In some embodiments, control circuitry may identify the accent characteristic by detecting, using voice processing circuitry, a respective manner of annunciating each syllable of a plurality of syllables of the voice communication. For example, as described above, control circuitry may monitor for distinctive tones or inflections in a human's annunciation. Control circuitry may then determine whether a threshold amount of syllables correspond to a single respective manner. For example, control circuitry may utilize a threshold for the purpose of ensuring that a human's accent is carried through a sufficient number of syllables such that control circuitry has a high confidence that the syllables represent the human's accent. Control circuitry may then, in response to determining that the threshold amount of syllables corresponds to the single respective manner, identify the accent characteristics by determining that the single respective manner corresponds to the accent characteristic.

In some embodiments, when control circuitry is detecting the respective manner of annunciating each syllable, control circuitry may compare the respective manner of annunciating each syllable to a known universe of potential manners of annunciating each syllable, and may identify a match between the respective manner and a manner in the known universe of potential manners. For example, control circuitry may consult a database to determine a closest match of databased manners of annunciating syllables to the manner in which the human annunciated each syllable.

In some embodiments, control circuitry may determine multiple countries of origin based on the cross-referencing of the accent characteristic. For example, control circuitry may not be able to discern which of three different countries the human hails from. Control circuitry may identify a single country of origin of the multiple countries that the human hails from by determining, using imaging circuitry, body characteristics of the human. For example, control circuitry may photograph or video the human. Control circuitry may then compare the body characteristics of the human to listings of a body characteristic database that correspond to each country of the multiple countries of origin, and determine, based on the comparing of the body characteristics of the human to the listings of the body characteristic database, the country of origin. For example, of the three remaining countries, the human may have body characteristics that most closely fit one of the three, and these body characteristics may be used by control circuitry as a tie breaker.

In some embodiments, when control circuitry is detecting the voice communication, control circuitry may detect, using a microphone, audio comprising communication from the human and ambient noise comprising audio of the media asset, and may isolate the audio comprising communication from the human from the ambient noise to detect the voice communication. Control circuitry may eliminate the ambient noise by using a directional microphone toward the human, or by any known noise filtering technique.

In some embodiments, the gesture comprises at least one of a hand movement, a leg movement, a body movement, and a collision between a body part of the human and an inanimate object. For example, any of a hand movement (e.g., "thumbs up"), a leg movement, like a kick, a full body movement (e.g., running around), or a collision between a body part of the human and an inanimate object (e.g., hitting a table with one's hand) may be a gesture.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DESCRIPTION

Figure 1:
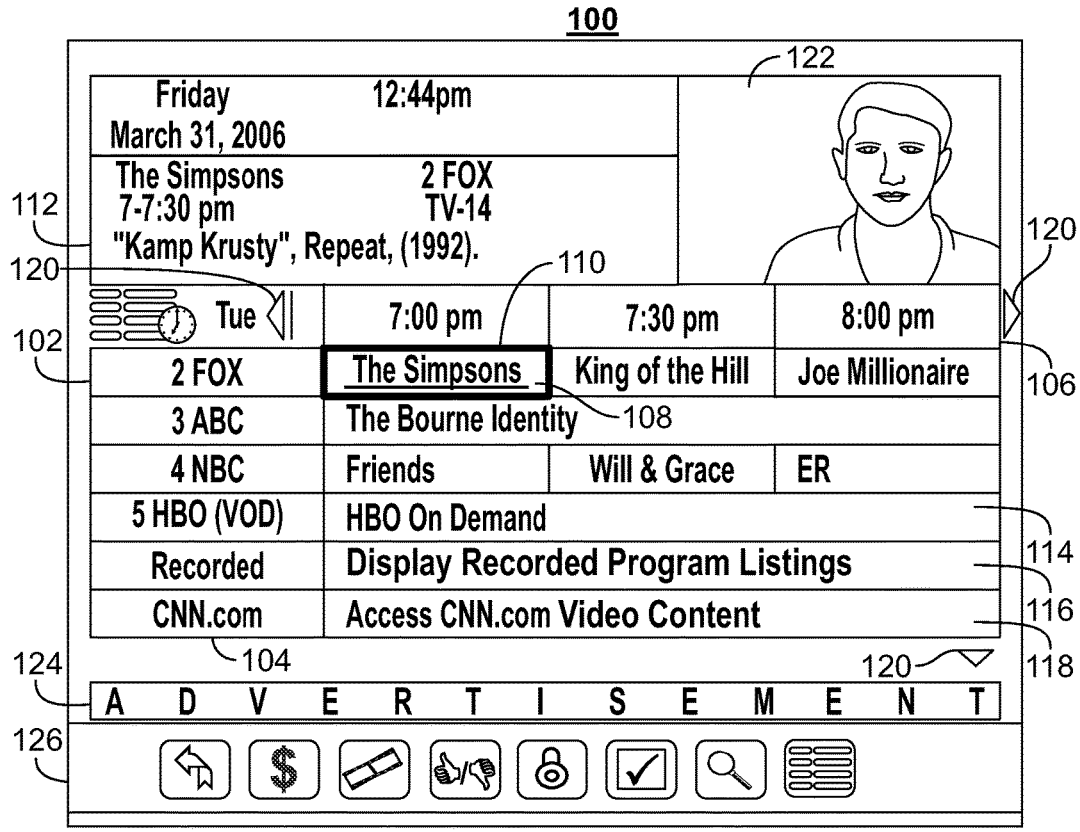
FIG. 1 shows an illustrative embodiment of a display screen that may be used to provide media guidance application listings and other media guidance information, in accordance with some embodiments of the disclosure.

In some aspects, systems and methods are provided for determining what culture a person hails from, and using that determination to determine the meaning of a gesture made by that person. For example, it is known that in the Western culture, a "thumbs up" sign may indicate a positive feeling about a media asset, whereas in Australia, a "thumbs up" sign may indicate a severely negative feeling about a media asset. In order to determine whether a user is offering a "thumbs up" gesture, control circuitry may analyze voice characteristics and/or body characteristics of a user to determine a user's culture.

To achieve these ends and others, in some aspects, systems and methods for determining meaning of cultural gestures based on voice detection are provided. In some embodiments, control circuitry may detect a voice communication from a human using voice detection circuitry during playback of a media asset being consumed by the user. For example, control circuitry may receive voice data by way of a microphone during playback of a media asset to determine vocal characteristics of a particular user viewing the media asset.

In some embodiments, control circuitry may identify an accent characteristic of the voice communication. For example, control circuitry may analyze a manner in which a particular word, syllable, or phrase is annunciated to determine an accent characteristic, such as an inflection in sound or tone, a nasal tone, a cadence, and the like. Control circuitry may then cross-reference the accent characteristic against listings of an accent database and then determine, based on the cross-referencing of the accent characteristic a country of origin of the human. As an example, if a person spoke with a distinctive accent that relates to a country of origin, control circuitry would find a match based on the cross-referencing.

In some embodiments, control circuitry may detect, using imaging circuitry, a gesture made by the human. For example, control circuitry may detect a "thumbs up" gesture using a camera. Control circuitry may then cross-reference the gesture against listings of a gesture database associated with the country of origin and then determine based on the cross-referencing of the gesture, a meaning of the gesture in relation to the media asset. For example, if the country of origin is Australia, control circuitry may determine that the "thumbs up" gesture shows negative distaste based on the cross-referencing, whereas if the country of origin is a Western country, control circuitry may determine that the "thumbs up" gesture shows positive feedback.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
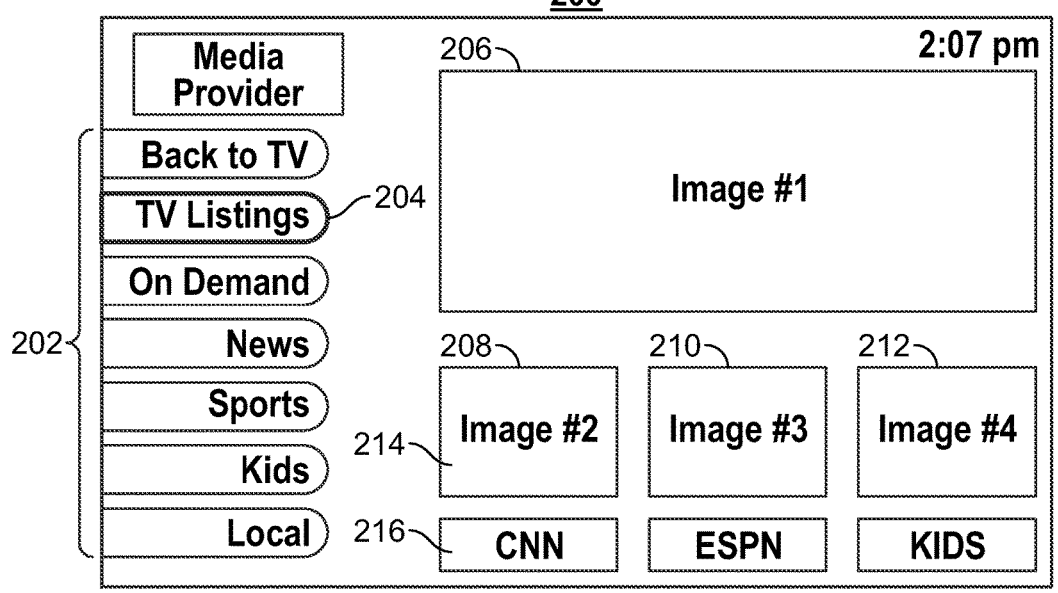
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
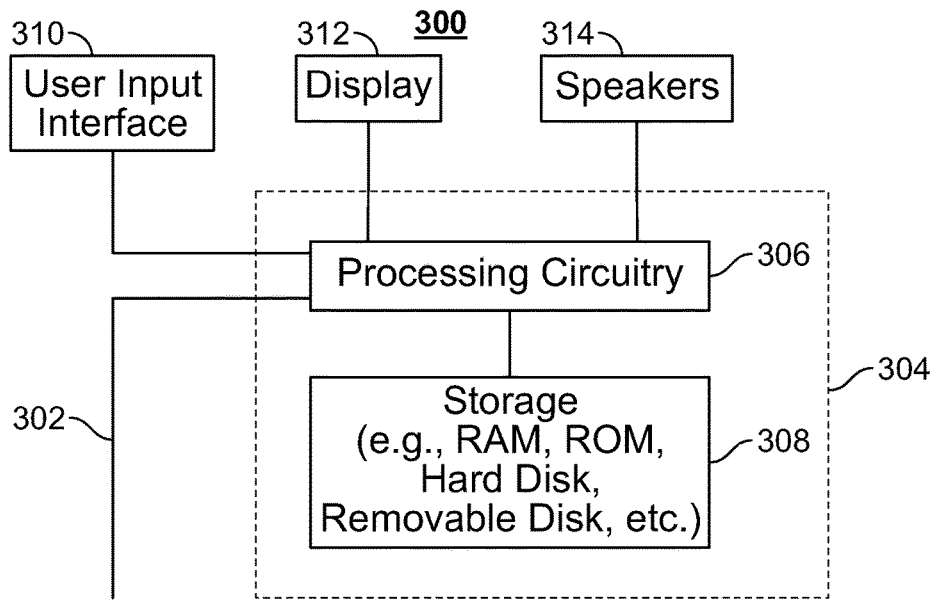
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
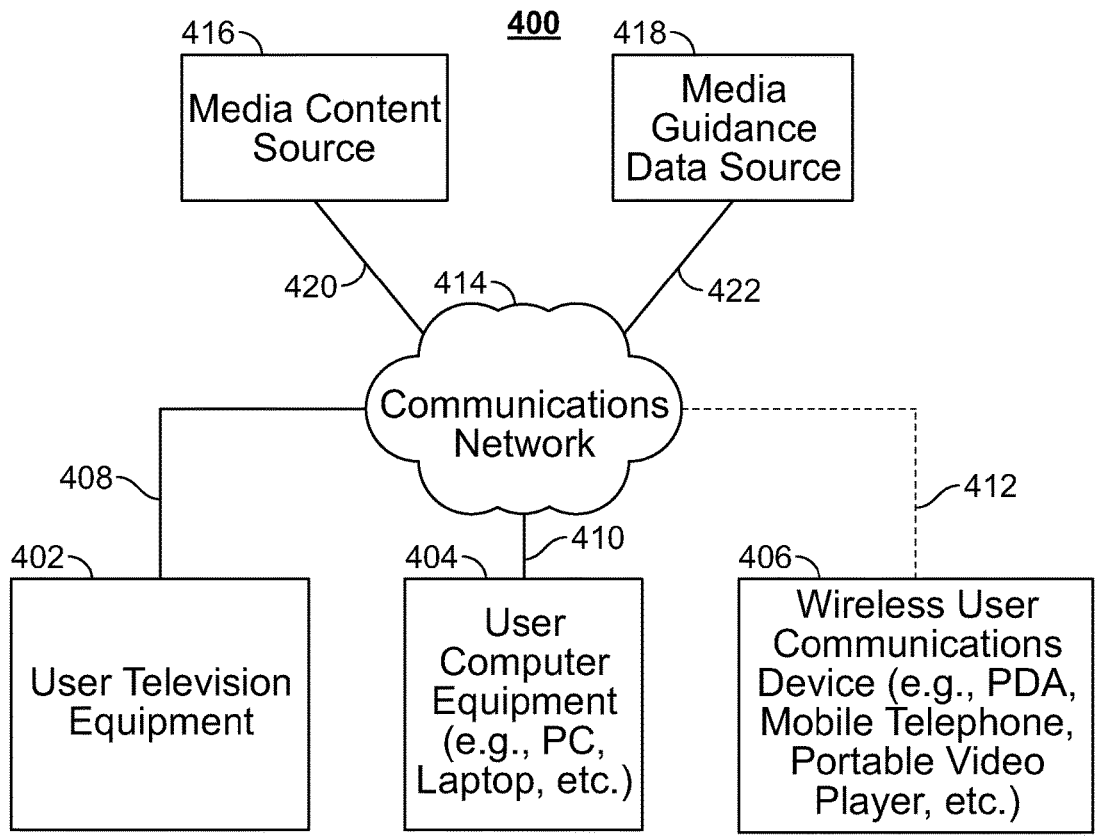
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to another action may include interstitial steps between the first action and the second action. As referred herein, the term "directly in response to" refers to caused by. For example, a first action being performed directly in response to another action may not include interstitial steps between the first action and the second action.

Figure 5:
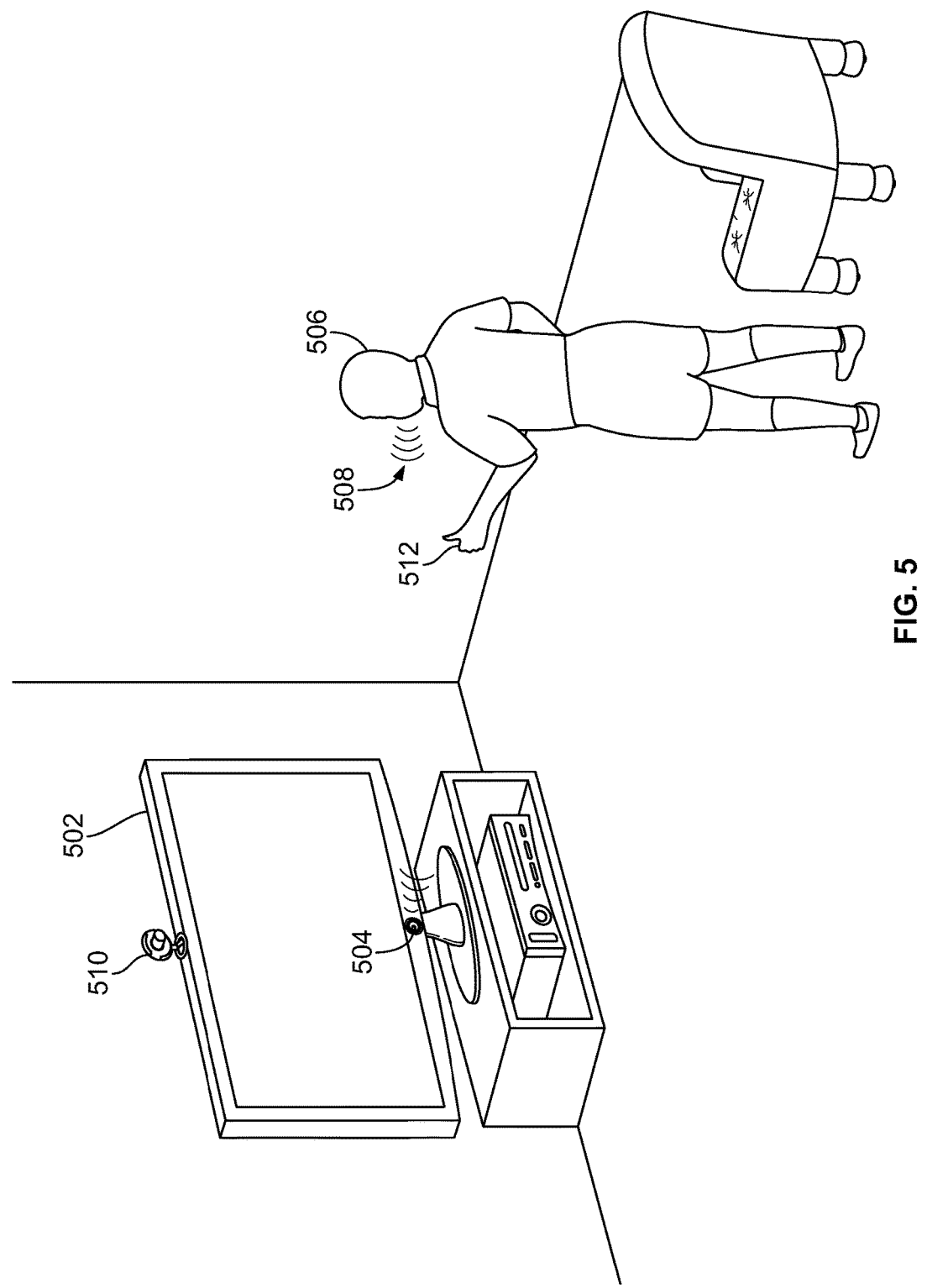
FIG. 5 depicts a user equipment configured to detect and resolve a meaning of a gesture, in accordance with some embodiments of this disclosure.

FIG. 5 depicts a user equipment configured to detect and resolve a meaning of a gesture, in accordance with some embodiments of this disclosure. User equipment 502 may have the functionality of any or all of user television equipment 402, user computer equipment 404, and/or wireless user communications device 406. User equipment 502 comprises microphone 504. Microphone 504 may be integrated with user equipment 502, or may be a peripheral device coupled to user equipment 502 using any known coupling mechanism, such as serial or wired connection, or a connection by way of a wireless connection, such as communications network 414. While microphone 504 is named microphone 504, microphone 504 may be any user input interface 310 as described in this disclosure.

User equipment 502 may additional include camera 510. Camera 510 may be integrated with user equipment 502, or may be a peripheral device coupled to user equipment 502 using any known coupling mechanism, such as serial or wired connection, or a connection by way of a wireless connection, such as communications network 414. While camera 502 is named camera 502, camera 502 may be any user input interface 310 as described in this disclosure for providing input by way of imaging, or any other imaging device, such as an imaging device like a heat or motion sensor.

Also depicted in FIG. 5 is human 506, who may speak a voice communication 508, which may be detected by microphone 504. Human 506 may additionally create a gesture 512 using a body part of human 506. The terms "human," "user," "viewer," and "person" may be used interchangeably throughout this disclosure.

In some embodiments, control circuitry 304 (e.g., of user equipment 502) may determine meaning of cultural gestures based on voice detection. To achieve this end, control circuitry 304 may detect voice communication 508 from human 506 using microphone 504, during playback of a media asset displayed by user equipment 502. For example, control circuitry 304 may use microphone 504 to listen to a voice communication from a viewer who is having a telephone conversation with a friend.

In some embodiments, control circuitry 304 may identify an accent characteristic of voice communication 508. For example, control circuitry 304 may detect (e.g., with voice processing circuitry coupled with microphone 504), a respective manner with which human 506 is annunciating each syllable of a plurality of syllables of voice communication 508, and may determine whether a threshold amount of syllables correspond to a single respective manner. As an example, control circuitry 304 may listen to several sentences of voice communication 508, and may determine that there is a distinctive manner in which human 506 is saying several syllables of those several sentences. Control circuitry 304 may use the threshold to establish a level of confidence that enough syllables are spoken in a manner distinctive to a particular accent to establish that a person is speaking with that particular accent.

In some embodiments, control circuitry 304 may, in response to determining that the threshold amount of syllables corresponds to the single respective manner, identify the accent characteristics by determining that the single respective manner corresponds to the accent characteristic. For example, when control circuitry 304 has established a sufficient level of confidence based on the threshold, as discussed above, control circuitry may determine that an accent characteristic has been identified.

In some embodiments, when control circuitry 304 detects the respective manner of annunciating each syllable, control circuitry 304 may compare the respective manner of annunciating each syllable to a known universe of potential manners of annunciating each syllable, and may identify a match between the respective manner and a manner in the known universe of potential manners. As an example, control circuitry 304 may determine a fingerprint or other identifier of a manner of annunciating any given syllable, and may compare that fingerprint to a database of fingerprints to determine which accent, of a plurality of potential accents, the given syllable corresponds to.

In some embodiments, as discussed above, control circuitry 304 may identify an accent characteristic of the voice communication. Control circuitry 304 may then cross-reference the accent characteristic against listings of an accent database, such as media guidance data source 418 or media content source 416, accessible by way of communications network 414. Control circuitry 304 may then determine, based on the cross-referencing of the accent characteristic, a country of origin of the human. For example, control circuitry 304 may, in the cross-referencing, find a match between the accent characteristic and a country of origin.

In some embodiments, control circuitry 304 may detect, using imaging circuitry, such as camera 510, a gesture 512 made by human 506. For example, control circuitry 304 may utilize a motion sensor integrated with camera 510 to determine a movement of a body part of human 506. Control circuitry 304 may, at the time of movement of the body part of human 506, use camera 510 to capture an image or series of images corresponding to gesture 510.

In detecting the gesture, control circuitry 304 may be confronted with so-called noise—i.e., movements of human 506 that are captured by camera 510, but are not intelligible gestures intended for control circuitry 304 to understand. In order to filter the noise, control circuitry 304 may use any known technique, such as only determining that a gesture has occurred if a movement of a body part of human 506 is held for a threshold amount of time. Other known methods may be, after determining a potential gesture of a body part of human 506, cross-referencing the potential gesture against listings of a database of known gestures to determine whether the potential gesture in fact maps to a known gesture. For example, while giving a "thumbs up" sign with one's hand may be attributed a known meaning, placing one's palm face-down on a table may not be attributed with a known meaning, and may thus be filtered out as noise by control circuitry 304.

In some embodiments, when control circuitry 304 has determined that a movement of a body part of human 506 is a gesture 512, control circuitry 304 may cross-reference the gesture 512 against listings of a gesture database associated with the country of origin (e.g., media content source 416 or media guidance data source 418, accessed by way of communications network 414). For example, if control circuitry 304 determines gesture 512 to be a "thumbs up" gesture, and control circuitry 304 has determined the country of origin as Australia, as discussed above and below, control circuitry 304 may determine, based on the cross-referencing, the meaning to be something completely different than it would have been if control circuitry 304 had cross-referenced against listings associated with a Western country, like Germany.

In some embodiments, control circuitry 304 may determine, based on the cross-referencing of the gesture, a meaning of the gesture in relation to the media asset. For example, as discussed above and below, a "thumbs up" may mean either distaste or enjoyment of the media asset displayed by user equipment 502. Control circuitry 304 may determine which of those potential meanings is accurate based on the cross-referencing, as discussed above and below.

In some embodiments, control circuitry 304 may providing a recommendation to human 506 based on the meaning of gesture 512. Control circuitry 304 may provide the recommendation by way of display 312, speakers 314, or any other output device. Control circuitry 304 may determine, based on gesture 512, that the user likes or dislikes the media asset (e.g., based on whether "thumbs up" means "like" or "dislike" as described above and below. If control circuitry 304 determines that the user likes the media asset currently being displayed on user equipment 502, control circuitry 304 may recommend a media asset, product, or service related to the media asset currently being displayed. On the contrary, if control circuitry 304 determines that the user does not like the media asset currently being displayed on user equipment 502, control circuitry 304 may recommend a media asset, product, or service that is not related to the media asset currently being displayed, or may update the user profile such that future recommendations do not incorporate subject matter related to that media asset.

In some embodiments, when providing a recommendation, control circuitry 304 may tailor the recommendation to the country of origin of human 506. For example, if human 506 is from Australia, and human 506 gives a "thumbs up" gesture 512 when watching a cartoon, control circuitry 304 may provide a recommendation of a media asset that Australians tend to like that is not a cartoon.

In some embodiments, as described above and below control circuitry 304 may determine the meaning of the gesture 512 to be any intelligible, known meaning. Several representative examples follow, the first of which is an indication of enjoyment or distaste of the media asset by human 506. Another possible meaning of a gesture 512 is an indication that the human 506 wishes to suspend viewing the media asset. For example, control circuitry 304 may detect a gesture 512 of human 506 extending his palm out, facing user equipment 502. Control circuitry 304 may determine, based on human 506's voice communication 508, that human 506 hails from a culture where that gesture 512 has a meaning of suspending playback of a media asset. One other possible meaning of gesture 512 is an indication that the human wishes to alert information about the media asset to another human. For example, if control circuitry 304 detects a gesture 512 of a user mimicking typing on a keyboard, control circuitry 304 may determine in the manners described above and below that the user hails from a culture in which that means to publish content to a social media platform. For example, control circuitry 304 may determine that human 506 has a social media account, such as a Facebook account, and may alert users of Facebook to the fact that human 506 is viewing the media asset displayed on user equipment 502.

In some embodiments, control circuitry 304 may, when cross-referencing the accent characteristic as described above and below, determine multiple countries of origin match the accent characteristic. Control circuitry 304 may then identify a single country of origin by first, determining, using imaging circuitry, body characteristics of human 506. For example, control circuitry 304 may receive an image of human 506 by way of camera 510. Control circuitry 304 may process the image to determine body characteristics of human 506 (e.g., by resolving skin color, body type, etc.).

Control circuitry 304 may then compare the body characteristics of human 506 to listings of a body characteristic database (e.g., media content source 416) that correspond to each country of the multiple countries of origin, and determine therefrom the country of origin. For example, control circuitry 304 may determine three potential countries of origin of human 506 based on voice communication 508, as described above and below. Control circuitry 304 may identify body characteristics of human 506, and may determine, based on the comparing operation, that only one of those three potential countries of origin match both the accent characteristics and the body type. Accordingly, this single country may be identified as human 506's country of origin.

In some embodiments, control circuitry 304 may detect voice communication 508 by using a microphone. While doing so, control circuitry 304 may also detect other audio, such as ambient noise comprising audio of the media asset played from user equipment 502. Control circuitry 304 may isolate the ambient noise, such as the noise from the playing of the media asset, from voice communication 508, in order to detect the voice communication 508. For example, control circuitry 304 may use any of a noise filter, voice recognition technology, directional microphones, or any other means of detecting the voice communication 508 without voice communication 508 being distorted by other ambient noise.

In some embodiments, when control circuitry 304 detects a gesture 512, the gesture may comprise any known gesture. As a non-limiting set of examples, the gesture may be at least one of a hand movement, a leg movement, a body movement, and a collision between a body part of the human and an inanimate object. Each gesture 512 may have meaning, as will be understood by control circuitry 304 based on a database (e.g., media content source 416) that reflects what a given known gesture means based on a user's country of origin, as described above and below.

Figure 6:
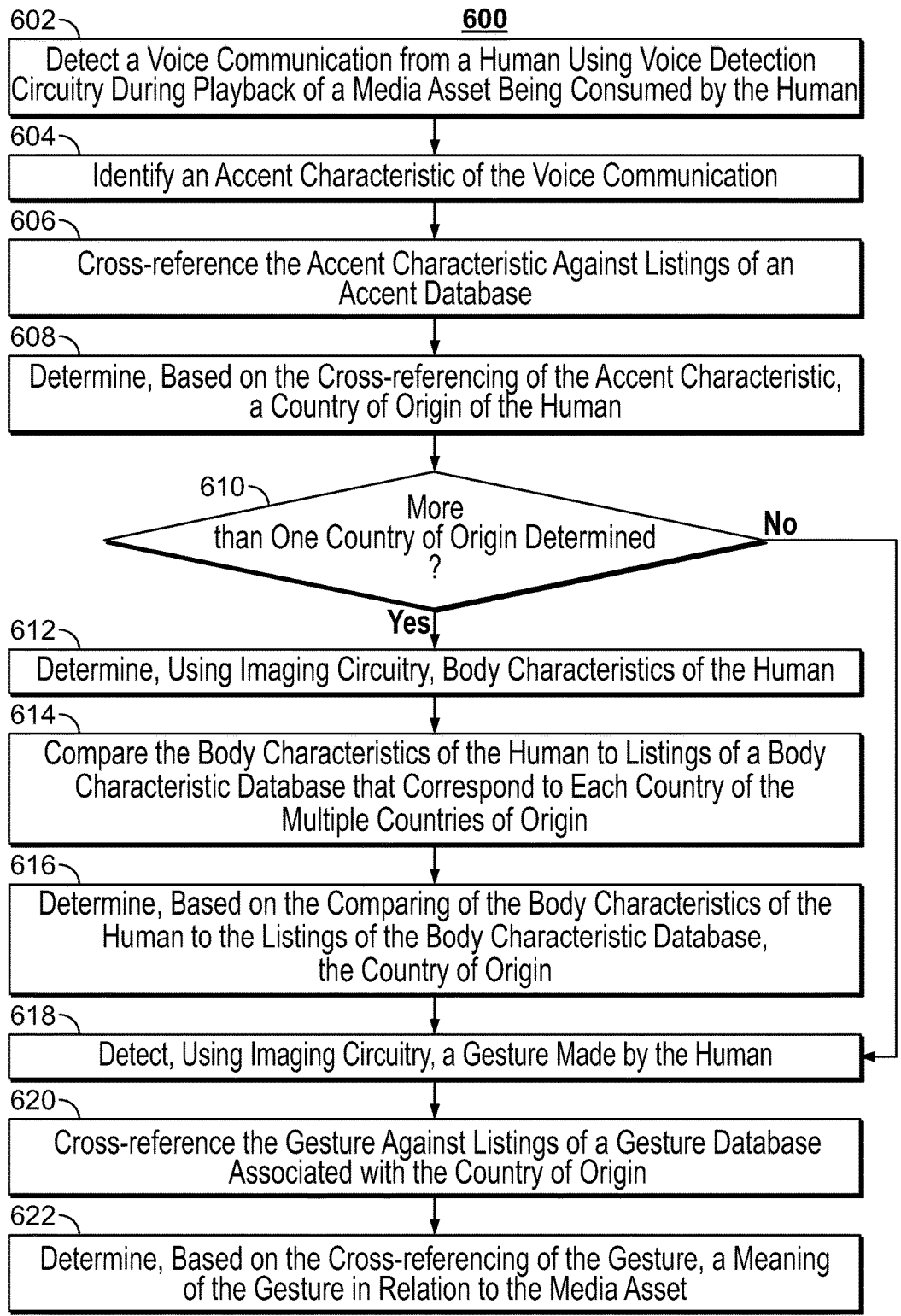
FIG. 6 is a flowchart of illustrative steps involved in determining a user's country of origin based on a voice command from the user, and determining a meaning of a user's gesture based on the country of origin, in accordance with some embodiments of the disclosure.

FIG. 6 is a flowchart of illustrative steps involved in determining a user's country of origin based on a voice command from the user, and determining a meaning of a user's gesture based on the country of origin, in accordance with some embodiments of the disclosure. It should be noted that process 600 or any step thereof could be performed on, or provided by, any of the devices shown in FIGS. 3-5. For example, process 600 may be executed by control circuitry 304 (FIG. 3) as instructed by control circuitry implemented on user equipment 402, 404, and/or 406 (FIG. 4) in order to determine a country of origin of a user. In addition, one or more steps of process 600 may be incorporated into or combined with one or more steps of any other process or embodiment.

Process 600 begins at 602, where control circuitry 304 (e.g., of user equipment 502) may detect a voice communication (e.g., voice communication 508) from a human (e.g., human 506). As an example, control circuitry 304 may detect the voice communication using a microphone (e.g., microphone 504), during playback of a media asset displayed by user equipment 502. For example, control circuitry 304 may use microphone 504 to listen to a voice communication from a viewer who is having a telephone conversation with a friend.

Process 600 may continue to 604, where control circuitry 304 may identify an accent characteristic of voice communication 508. For example, control circuitry 304 may detect (e.g., with voice processing circuitry coupled with microphone 504), a respective manner with which human 506 is annunciating each syllable of a plurality of syllables of voice communication 508, and may determine whether a threshold amount of syllables correspond to a single respective manner. Control circuitry 304 may identify the accent characteristic in any manner described above and below.

Process 600 may then continue to 606, where control circuitry 304 may cross-reference the accent characteristic against listings of an accent database, such as media guidance data source 418 or media content source 416, accessible by way of communications network 414. Process 600 may then continue to 608, where control circuitry 304 may then determine, based on the cross-referencing of the accent characteristic, a country of origin of the human. For example, control circuitry 304 may, in the cross-referencing, find a match between the accent characteristic and a country of origin.

Process 600 may optionally proceed to 610, or may proceed to 618 directly. At 610, control circuitry 304 may determine whether more than one country of origin was determined at 608. If more than one country of origin is not determined, process 600 may continue to 618. If more than one country is determined, process 600 may continue to 612. At 612, control circuitry 304 may, when cross-referencing the accent characteristic as described above and below, determine multiple countries of origin match the accent characteristic. Control circuitry 304 may then identify a single country of origin. To achieve this end, process 600 may proceed to 612, where control circuitry 304 may determine, using imaging circuitry, body characteristics of human 506. For example, control circuitry 304 may receive an image of human 506 by way of camera 510. Control circuitry 304 may process the image to determine body characteristics of human 506 (e.g., by resolving skin color, body type, etc.).

Process 600 may then continue to 614, where control circuitry 304 may compare the body characteristics of human 506 to listings of a body characteristic database (e.g., media content source 416) that correspond to each country of the multiple countries of origin, and determine therefrom the country of origin. For example, control circuitry 304 may determine three potential countries of origin of human 506 based on voice communication 508, as described above and below. Control circuitry 304 may identify body characteristics of human 506. Process 600 may then continue to 616, where control circuitry 304 may determine, based on the comparing operation, that only one of those three potential countries of origin match both the accent characteristics and the body type. Accordingly, this single country may be identified as human 506's country of origin.

At 618, control circuitry 304 may detect, using imaging circuitry, such as camera 510, a gesture 512 made by human 506. For example, control circuitry 304 may utilize a motion sensor integrated with camera 510 to determine a movement of a body part of human 506. Control circuitry 304 may, at the time of movement of the body part of human 506, use camera 510 to capture an image or series of images corresponding to gesture 510.

Process 600 may then continue to 620, where, when control circuitry 304 has determined that a movement of a body part of human 506 is a gesture 512, control circuitry 304 may cross-reference the gesture 512 against listings of a gesture database associated with the country of origin (e.g., media content source 416 or media guidance data source 418, accessed by way of communications network 414). For example, if control circuitry 304 determines gesture 512 to be a "thumbs up" gesture, and control circuitry 304 has determined the country of origin as Australia, as discussed above and below, control circuitry 304 may determine, based on the cross-referencing, the meaning to be something completely different than it would have been if control circuitry 304 had cross-referenced against listings associated with a Western country, like Germany.

Process 600 may then continue to 622, where control circuitry 304 may determine, based on the cross-referencing of the gesture, a meaning of the gesture in relation to the media asset. For example, as discussed above and below, a "thumbs up" may mean either distaste or enjoyment of the media asset displayed by user equipment 502. Control circuitry 304 may determine which of those potential meanings is accurate based on the cross-referencing, as discussed above and below.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, determination of a meaning of a gesture may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, listing of a database as described herein may be stored in, and retrieved from, storage 308 of FIG. 3, or media guidance data source 418 of FIG. 4. Furthermore, processing circuitry, or a computer program, may update settings associated with a user, such as a country of origin, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing recommendations in relation to media assets in gesture recognition computer systems by determining a meaning of cultural gestures based on voice detection, the method comprising:
   generating for display a media asset for playback;
   detecting a voice communication from a human using voice detection circuitry during playback of the media asset being consumed by the human;
   identifying an accent characteristic of the voice communication;
   cross-referencing the accent characteristic against listings of an accent database;
   determining, based on the cross-referencing of the accent characteristic, a country of origin of the human;
   detecting, using imaging circuitry, a gesture made by the human;
   cross-referencing the gesture against listings of a gesture database associated with the country of origin to determine whether the gesture corresponds to a meaning in the country of origin;
   determining, based on the cross-referencing of the gesture, a meaning of the gesture in relation to the media asset; and
   providing a recommendation to the human based on the meaning of the gesture in relation to the media asset.

2. The method of claim 1, wherein the recommendation is tailored to the country of origin.

3. The method of claim 1, wherein the meaning comprises at least one of: an indication of enjoyment of the media asset by the human; an indication of distaste for the media asset by the human; an indication that the human wishes to suspend viewing the media asset; and an indication that the human wishes to alert information about the media asset to another human.

4. The method of claim 1, wherein the identifying of the accent characteristic comprise:
   detecting, using voice processing circuitry, a respective manner of annunciating each syllable of a plurality of syllables of the voice communication;
   determining whether a threshold amount of syllables correspond to a single respective manner; and
   in response to determining that the threshold amount of syllables corresponds to the single respective manner, identifying the accent characteristics by determining that the single respective manner corresponds to the accent characteristic.

5. The method of claim 4, wherein detecting the respective manner of annunciating each syllable comprises comparing the respective manner of annunciating each syllable to a known universe of potential manners of annunciating each syllable, and identifying a match between the respective manner and a manner in the known universe of potential manners.

6. The method of claim 1, wherein the meaning of the gesture varies based on the country of origin.

7. The method of claim 1, wherein multiple countries of origin are determined based on the cross-referencing of the accent characteristic, and wherein a single country of origin of the multiple countries of origin is identified by:
   determining, using imaging circuitry, body characteristics of the human;
   comparing the body characteristics of the human to listings of a body characteristic database that correspond to each country of the multiple countries of origin; and
   determining, based on the comparing of the body characteristics of the human to the listings of the body characteristic database, the country of origin.

8. The method of claim 1, wherein detecting the voice communication comprises:
   detecting, using a microphone, audio comprising communication from the human and ambient noise comprising audio of the media asset; and
   isolating the audio comprising communication from the human from the ambient noise to detect the voice communication.

9. The method of claim 1, wherein the gesture comprises at least one of a hand movement, a leg movement, a body movement, and a collision between a body part of the human and an inanimate object.

10. A system for providing recommendations in relation to media assets in gesture recognition computer systems by determining a meaning of cultural gestures based on voice detection, the system comprising:
    voice detection circuitry;
    imaging circuitry configured to generate for display a media asset for playback; and
    control circuitry configured to:
    detect, using the voice detection circuitry, a voice communication from a human during playback of the media asset being consumed by the human;
    identify an accent characteristic of the voice communication;
    cross-reference the accent characteristic against listings of an accent database;
    determine, based on the cross-referencing of the accent characteristic, a country of origin of the human;
    detect, using the imaging circuitry, a gesture made by the human;
    cross-reference the gesture against listings of a gesture database associated with the country of origin to determine whether the gesture corresponds to a meaning in the country of origin; and
    determine, based on the cross-referencing of the gesture, a meaning of the gesture in relation to the media asset, wherein a recommendation is provided, by the imaging circuitry, to the human based on the meaning of the gesture in relation to the media asset.

11. The system of claim 10, wherein the recommendation is tailored to the country of origin.

12. The system of claim 10, wherein the meaning comprises at least one of: an indication of enjoyment of the media asset by the human; an indication of distaste for the media asset by the human; an indication that the human wishes to suspend viewing the media asset; and an indication that the human wishes to alert information about the media asset to another human.

13. The system of claim 10, wherein the system further comprises voice processing circuitry, and wherein the control circuitry is further configured, when identifying of the accent characteristic, to:
    detect, using the voice processing circuitry, a respective manner of annunciating each syllable of a plurality of syllables of the voice communication;
    determine whether a threshold amount of syllables correspond to a single respective manner; and
    in response to determining that the threshold amount of syllables corresponds to the single respective manner, identify the accent characteristics by determining that the single respective manner corresponds to the accent characteristic.

14. The system of claim 13, wherein the control circuitry is further configured, when detecting the respective manner of annunciating each syllable, to compare the respective manner of annunciating each syllable to a known universe of potential manners of annunciating each syllable, and to identify a match between the respective manner and a manner in the known universe of potential manners.

15. The system of claim 10, wherein the meaning of the gesture varies based on the country of origin.

16. The system of claim 10, wherein multiple countries of origin are determined based on the cross-referencing of the accent characteristic, and wherein control circuitry is further configured to identify a single country of origin of the multiple countries of origin by:
　determining, using the imaging circuitry, body characteristics of the human;
　comparing the body characteristics of the human to listings of a body characteristic database that correspond to each country of the multiple countries of origin; and
　determining, based on the comparing of the body characteristics of the human to the listings of the body characteristic database, the country of origin.

17. The system of claim 10, wherein the system further comprises a microphone, and wherein the control circuitry is further configured, when detecting the voice communication, to:
　detect, using the microphone, audio comprising communication from the human and ambient noise comprising audio of the media asset; and
　isolate the audio comprising communication from the human from the ambient noise to detect the voice communication.

18. The system of claim 10, wherein the gesture comprises at least one of a hand movement, a leg movement, a body movement, and a collision between a body part of the human and an inanimate object.

\* \* \* \* \*